(12) United States Patent
Jia et al.

(10) Patent No.: US 7,092,564 B2
(45) Date of Patent: Aug. 15, 2006

(54) AUTOMATIC GENERATION OF FRAMES FOR DIGITAL IMAGES

(75) Inventors: Charles Chi Jia, San Diego, CA (US); Cindy Sansom-Wai, San Diego, CA (US); Laura X. Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 977 days.

(21) Appl. No.: 09/845,869

(22) Filed: Apr. 30, 2001

(65) Prior Publication Data

US 2003/0021468 A1    Jan. 30, 2003

(51) Int. Cl.
G06K 9/00    (2006.01)
G06K 9/54    (2006.01)
G09G 5/00    (2006.01)

(52) U.S. Cl. .................... 382/162; 382/307; 345/634
(58) Field of Classification Search ............... 382/284, 382/294, 162, 307; 348/586, 589; 396/2; 345/634, 636
See application file for complete search history.

(56) References Cited

U.S. PATENT DOCUMENTS

| | | | |
|---|---|---|---|
| 5,140,348 A * | 8/1992 | Jamzadeh et al. ......... 347/115 |
| 5,600,412 A * | 2/1997 | Connors ...................... 399/81 |
| 5,815,645 A * | 9/1998 | Fredlund et al. .......... 358/1.18 |
| 5,889,578 A * | 3/1999 | Jamzadeh ................... 355/41 |
| 6,421,062 B1 * | 7/2002 | Higashio ................... 345/634 |
| 6,587,596 B1 * | 7/2003 | Haeberli .................... 382/283 |
| 2001/0012062 A1 * | 8/2001 | Anderson .................. 348/222 |

FOREIGN PATENT DOCUMENTS

JP    09138846 A    5/1997

* cited by examiner

Primary Examiner—Vikkram Bali
Assistant Examiner—Colin LaRose
(74) Attorney, Agent, or Firm—Robert C. Sismilich

(57) ABSTRACT

An image processing apparatus and method for analyzing a digital image and automatically generating a visually attractive frame for the image. A data set for the image is analyzed, preferably in color space, to determine one or more image components representing dominant colors in the image. The components are characterized individually, and then these individual component characterizations are used to characterize the image overall. Based on the overall image characteristics, the framing scheme parameters are determined and used in turn to generate the attributes of a visually attractive frame for the image. A data set for the framed image is then generated, which may be sent to an imaging device for display or printing, or simply stored as a new data set for later use. The user has the ability to modify the rules that determine the framing scheme parameters so as to adjust the framed image if desired.

23 Claims, 8 Drawing Sheets

AUTOMATIC GENERATION OF FRAMES FOR DIGITAL IMAGES

FIELD OF THE INVENTION

The present invention relates generally to digital image processing, and pertains more particularly to processing a digital image so as to automatically generate a visually pleasing frame for the image.

BACKGROUND OF THE INVENTION

In recent times, digital cameras capable of taking a digital photograph of a scene and recording a corresponding digital image file have come into widespread usage. The quality of such cameras has recently improved to the point where they are capable of capturing digital images with sufficiently high resolution and colorfulness that good quality digital photographic prints up to an 8 inch by 10 inch size, or even larger, can now be made when the digital image file is printed on a photographic-quality computer printer. In addition to digital cameras, scanners or multifunction printers can also generate digital image files of similar or better resolution by optically scanning a traditional photographic print.

Photographic prints are frequently intended for mounting in a picture frame. Typical plastic or wooden frames serve to provide a border around the print. The border can range from narrow to wide, and from simple to ornate. Frames typically also provide a transparent covering, typically glass or clear plastic, over the print. Before (or sometimes instead of) framing, some prints are matted, typically with one or more colored cardboard mats.

Picture frames of a given size come in a range of prices, with higher quality or more ornate frames typically being more expensive. Because of the border provided by the mat, a matted print needs a larger size frame than would be needed for the unmatted print. The mat boards themselves are an added cost. In addition, while pre-cut mat boards are available for standard-size prints (eg. 5×7, 8×10, 11×14, etc.), mat boards for either odd-size frames or odd-size prints must typically be cut by the user.

Since matted and framed prints are typically intended to be wall-mounted and displayed, for example, in a home or office, it is important that the combination of frame, mat, and print be a visually pleasing one. It is thus necessary for a person to choose a frame and mat having the proper colors to achieve such a visually pleasing result.

The cost and time involved with shopping for the proper frame, mat board, or both can be considerable. Also, determining which color frame and mat(s) will provide an aesthetically pleasing result can be confusing and/or time-consuming. In some cases, the ideal color or pattern may not be available at all.

Some computer graphics programs provide a predefined set of "digital frames" that can be combined with digital images prior to printing. Typically a variety of border styles and colors are provided for the user to select from. While such a program may reduce shopping time and cost associated with framing, it is still left up to the user to determine what color and style of border will provide a visually pleasing result. Accordingly, it would be highly desirable to have a new and improved image processing apparatus and method that frames a digital image in a visually pleasing manner without undue effort on the part of the user.

SUMMARY OF THE INVENTION

In a preferred embodiment, the present invention provides a method that automatically generates a visually attractive frame around a digital image based on particular characteristics of the image. By printing the combined frame and image on a hardcopy output device such as a printer, a framed image is conveniently and inexpensively realized. The method analyzes at least a portion of the data set representing the rows and columns of pixels of the digital image so as to identify one or more image characteristics of the digital image. Based on the image characteristics, one or more attributes of a visually attractive frame are automatically determined, and a second data set is generated for the framed image. The pixels of the second data set define a representation of the unframed digital image surrounded by a frame having the frame attributes.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein.

DESCRIPTION OF THE PREFERRED EMBODIMENTS

Figure 1:
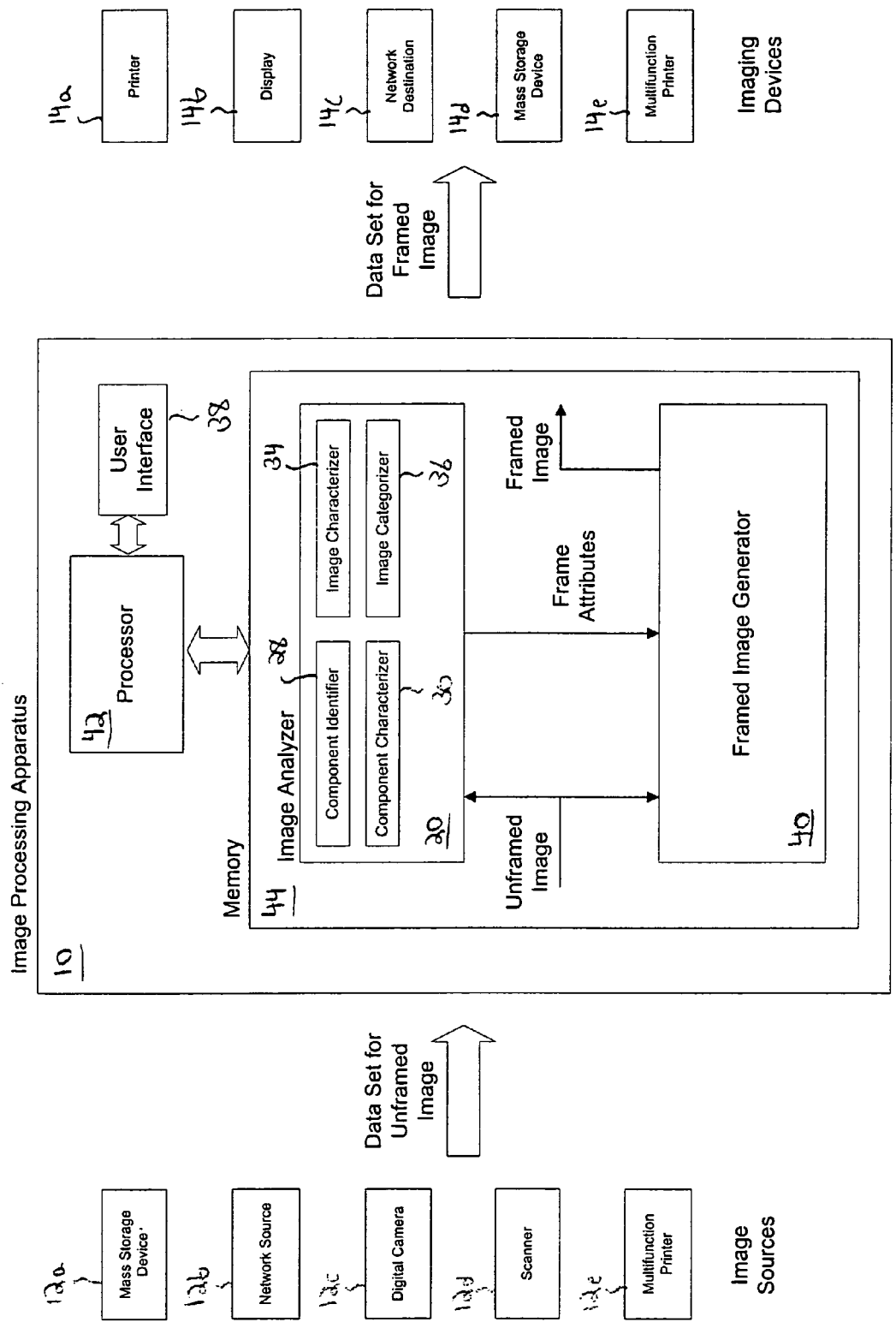
FIG. 1 is a block diagram of a novel image processing apparatus for automatically framing a digital image according to the present invention.

Referring now to the drawings, there is illustrated an image processing apparatus constructed in accordance with the present invention which automatically generates a visually attractive printed frame or border around a print of a user-selected digital image, in accordance with a novel image processing method of the invention. Such an apparatus analyzes the contents of the digital image and automatically determines a color pattern for the frame or border that will provide a visually pleasing effect. The apparatus thus can reduce the confusion and time expended by a person to manually mat and frame a print of the digital image. Incorporating the frame or border into the print of the digital image may also allow a less-expensive frame to be used to physically mount the print.

Figure 2:
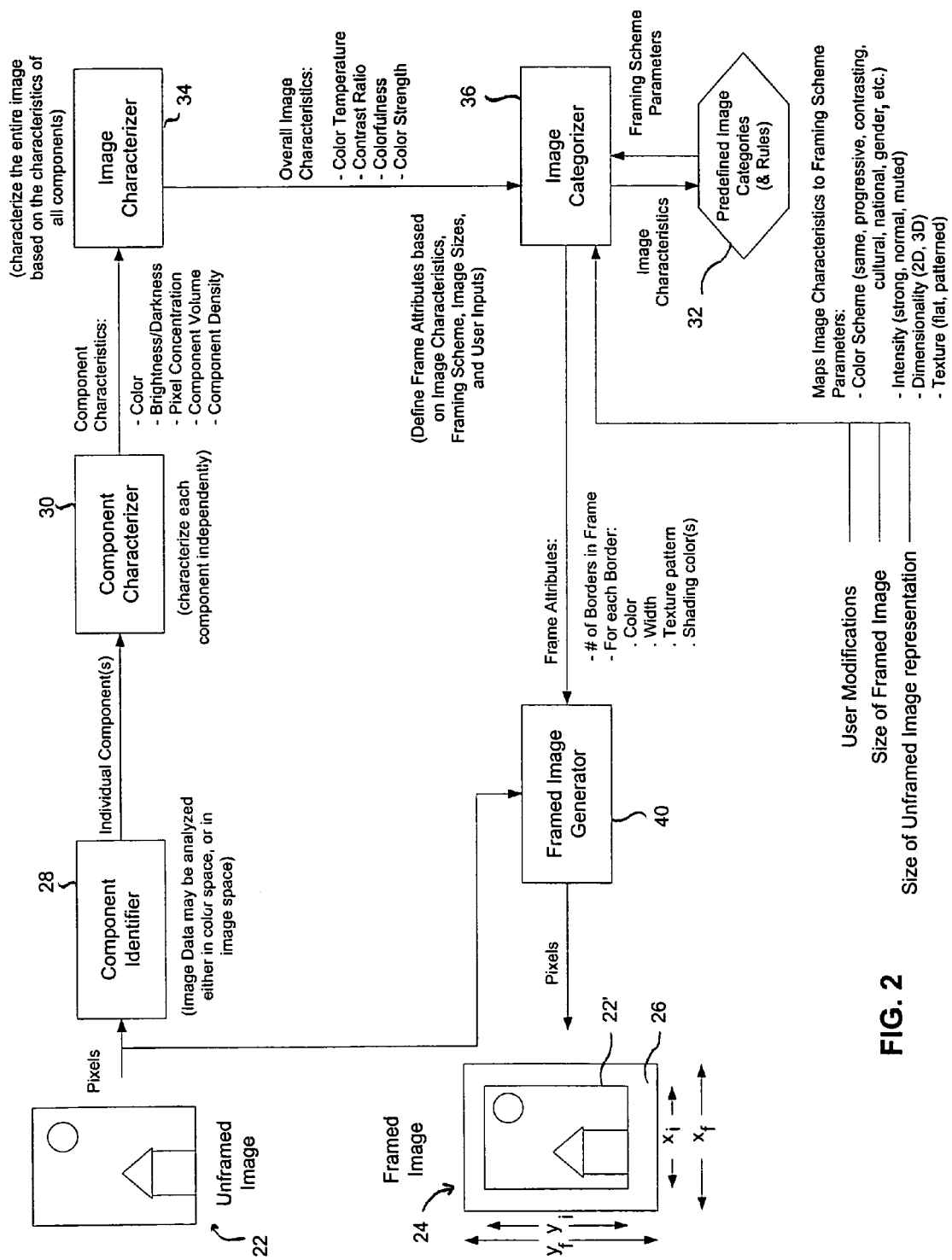
FIG. 2 is a schematic data flow representation of the automatic framing of a digital image as performed by the image processing apparatus of FIG. 1.

As best understood with reference to FIGS. 1 and 2, a preferred embodiment of the image processing apparatus 10 includes an image analyzer 20 that is communicatively coupled to a framed image generator 40. In operation, the image analyzer 20 processes a data set representing an unframed digital image 22 so as to determine one or more frame attributes of a frame 26 that is visually attractive when combined with the unframed digital image 22. The frame attributes are provided to the framed image generator 40, which in turn processes the data set for the unframed digital image 22 in order to generate a new data set for the framed digital image 24. The new data set for the framed digital image 24 includes data representing the unframed digital image 22 surrounded by a frame 26 having the frame attributes. The image analyzer 10 will be subsequently considered in further detail, after a discussion of a novel method of image processing according to the present invention that is usable with the image processing apparatus 10.

Figure 3:
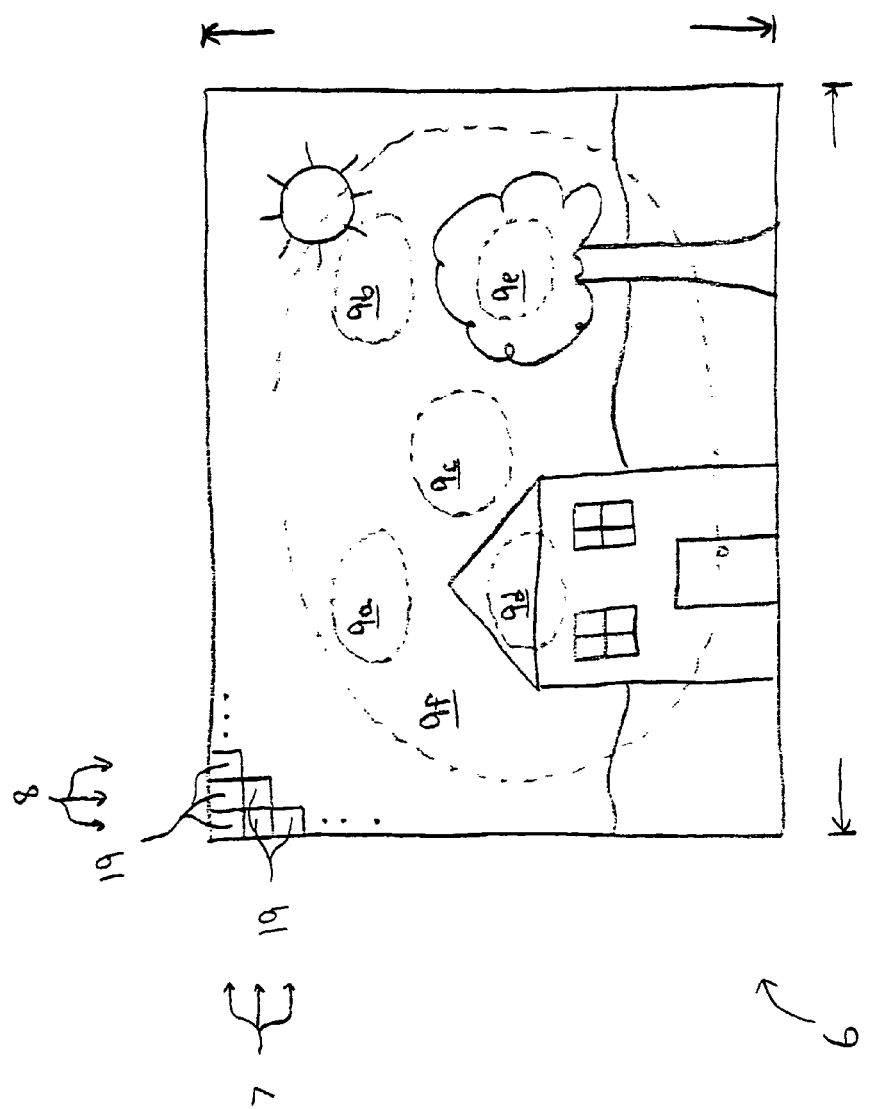
FIG. 3 is a two-dimensional image space representation of an unframed image framable by the image processing apparatus of FIG. 1.

Before discussing the novel image processing method in further detail, however, it is beneficial to briefly discuss the data sets that are used to represent digital images with reference to FIG. 3. As is known to those skilled in the art, the digital data representing an image 22 typically is stored as a set of individual image pixels. These pixels may be logically mapped to in rows (such as exemplary rows 7) and columns (such as exemplary columns 8) of a two-dimensional image space 6 to form the image 22. Each image pixel represents the color and intensity of a small rectangular area 19 of the image 22. Typically each row and column has a pixel resolution of at least 75 to 600 or more pixels per inch. Image pixel data may be stored in a variety of different formats. A preferred format is RGB. A pixel in RGB format contains three parameters: one each for red, green, and blue colored information. The value of each of these parameters indicates the intensity of the corresponding color at that pixel. The various possible combinations of the red, green, and blue parameters allow different pixels to represent a wide range of colors and intensities. When the color and intensity of each pixel is displayed or printed in this two-dimensional image space, the image 22 is depicted.

Figure 4:
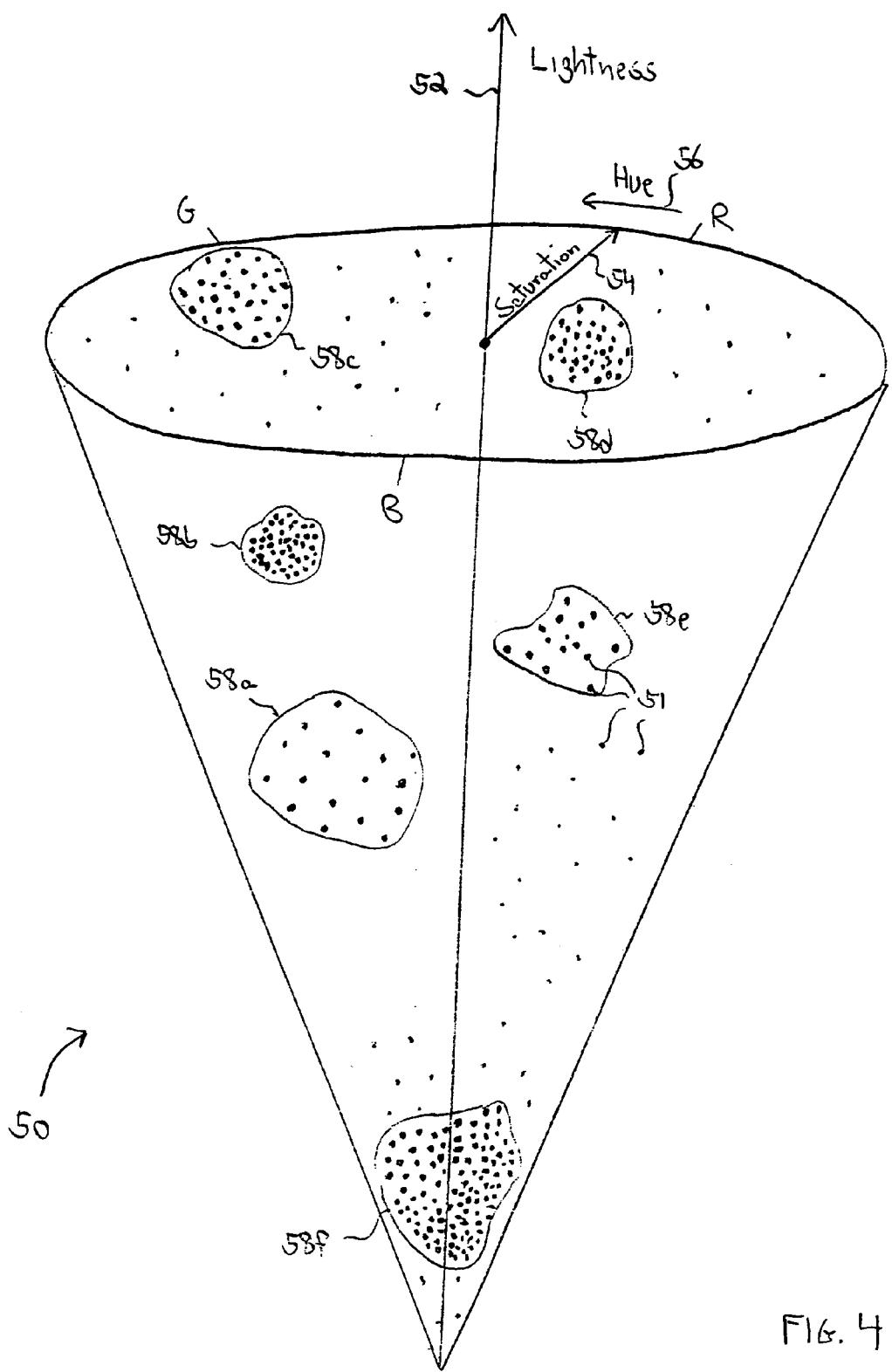
FIG. 4 is a three-dimensional color space representation of an unframed image framable by the image processing apparatus of FIG. 1.

Alternatively, and with reference to FIG. 4, the image data pixels may also be logically mapped to a number of alternative three-dimensional color spaces known to those skilled in the art, such as HSL color space 50. HSL color space 8 may be represented as a cone having a central axis 52 representing lightness (L), a radial axis 54 extending out from the central axis 52 representing saturation (S), and an angular component 56 representing the hue (H). The particular shade of color of a pixel, such as pixels 51, is represented as a position on a plane of the cone orthogonal to the lightness axis 52, while the lightness or darkness of a pixel is represented by the location on the lightness axis 52 of the plane. As will be discussed subsequently in further detail, arranging the pixels of the unframed image 22 in a three-dimensional color space is beneficial for automatically generating a visually pleasing frame for the image 22. While the HSL color space is depicted here for simplicity of understanding, the HSL color space is logarithmic with respect to the characteristics of human visual perception, and therefore it should be understood that the preferred color space for the present invention is CIE L*a*b* space which has a linear relationship to human visual perception. Further details about these color spaces, and about the conversion of RGB data to and from these spaces, is well understood by those skilled in the art. See, e.g., "Frequently Asked Questions about Color" by Charles A. Poynton, and "Color Space Conversions" by Adrian Ford and Alan Roberts, both of which are presently available on the world wide web.

Figure 5:
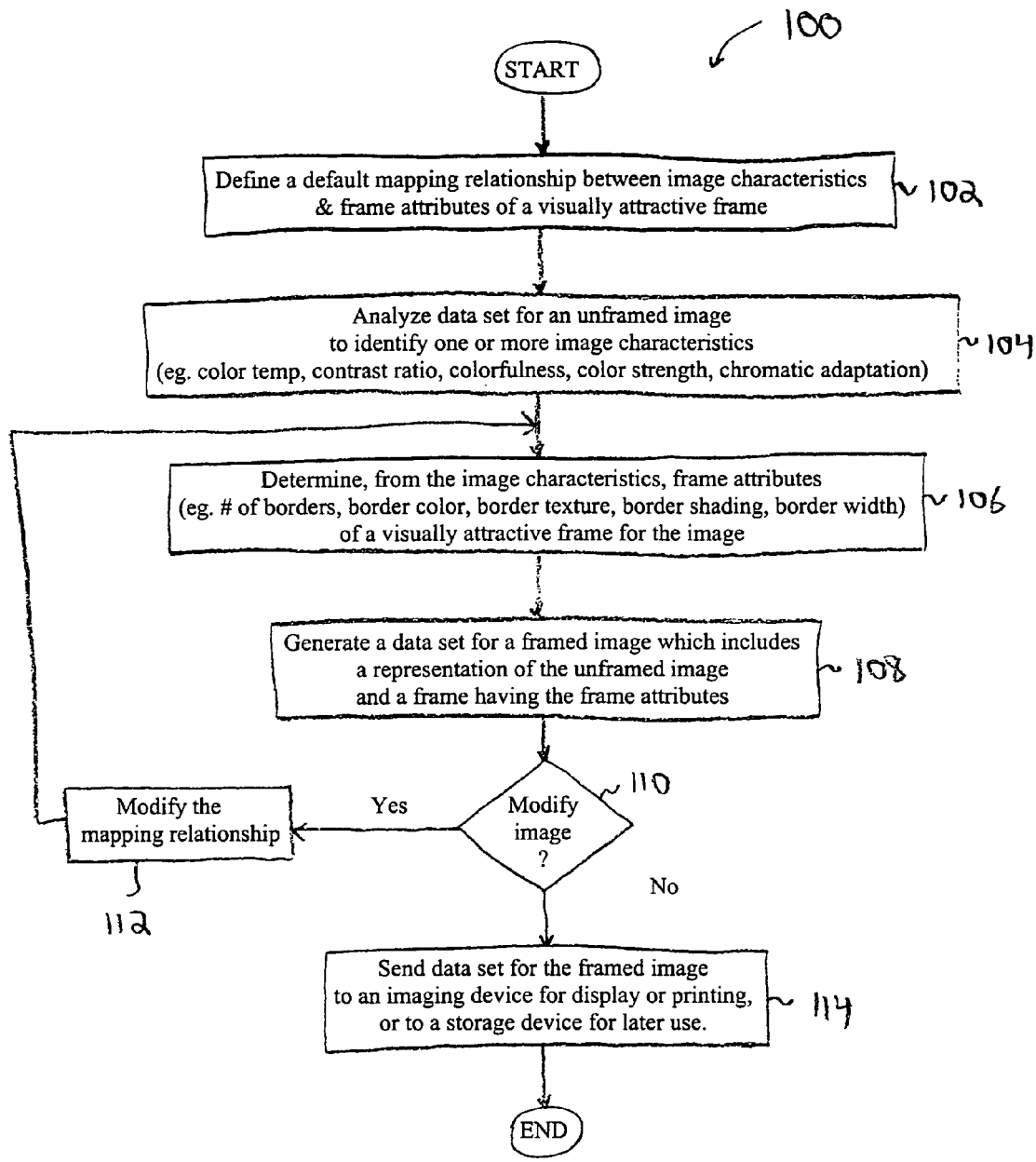
FIG. 5 is a top-level flowchart of a novel automatic frame generation method usable with the image processing apparatus of FIG. 1.
Figure 6:
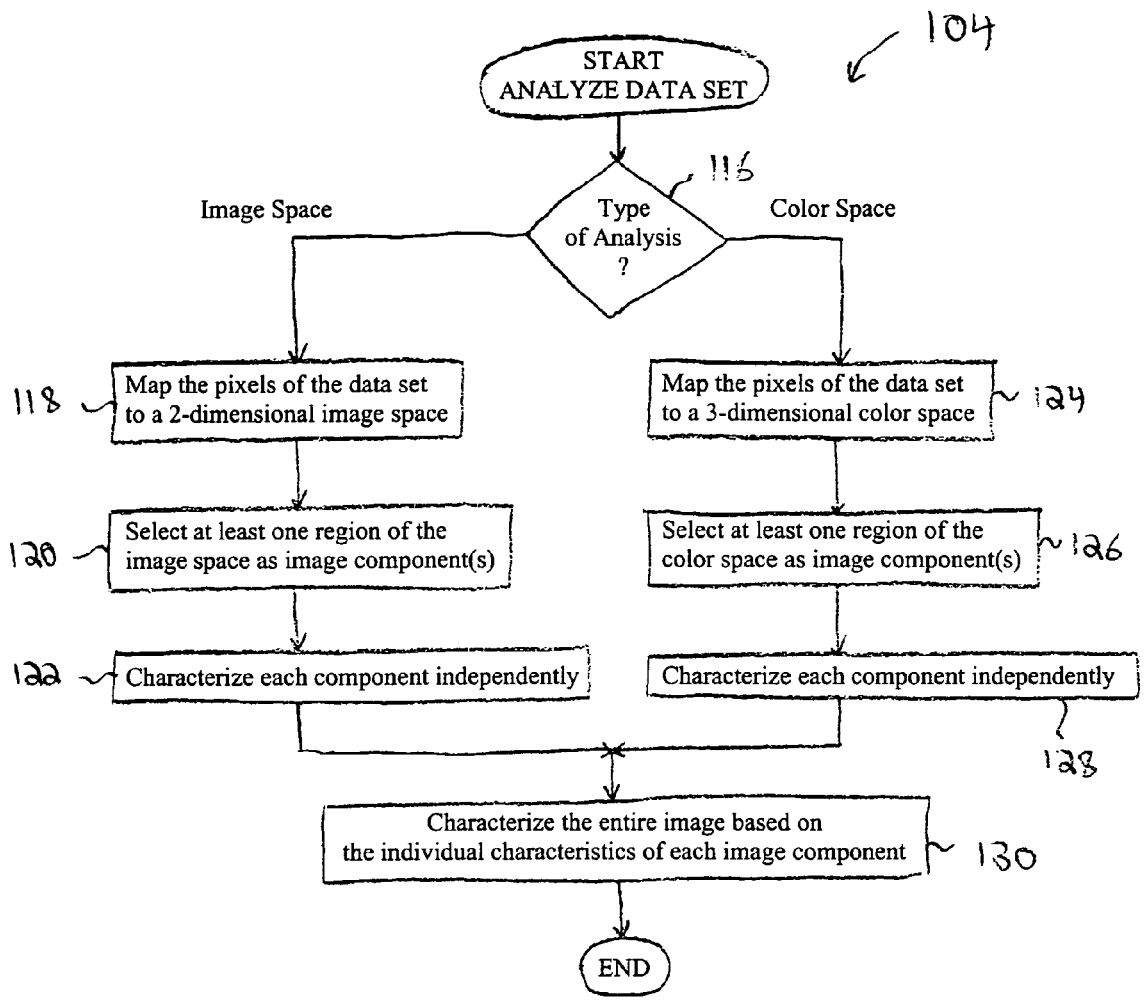
FIGS. 6 and 7 are lower-level flowcharts of different portions of the automatic frame generation method of FIG. 5.

Bearing in mind the preceding discussion of image data pixels, image space, and color space, the present invention, as best understood with reference to FIGS. 2 and 5, may also be implemented as a method 100 for automatically generating a framed digital image from the data for an unframed digital image. The method begins at 102 by predefining a number of image categories 32, as will be discussed subsequently in further detail, that specify a default mapping relationship between the image characteristics of images 22 to be framed, and the attributes of a visually attractive frame 26 for those images. At 104, and as will also be described subsequently in greater detail, the data set for an unframed image 22 is analyzed to identify one or more image characteristics. At 106, and as will additionally be described subsequently in greater detail, the method determines, from the image characteristics, certain frame attributes of a visually attractive frame for the image. At 108, a data set for a framed image 24 is generated. The data set includes data for a representation 22' of the unframed image 22, and a frame 26 having the frame attributes surrounding the unframed image 22. The unframed image 22 may, as will be discussed subsequently, be scaled in size or otherwise adjusted to form the representation 22' that is included in the framed image 26. At 110, it is determined whether or not the data set for the framed image 24 should be modified; usually this includes providing a visual preview of the framed image 26 to a user. If the user wishes to modify the framed image ("Yes" branch of 10), he or she can modify the mapping relationship at 112 as will be described subsequently, and the method branches to 106 to redetermine the frame attributes. If the user does not wish to modify the framed image ("No" branch of 110), then at 114 the data set for the framed image 24 is sent to an imaging device 14a–14e for display or printing, or to a storage device such as a disk drive for later access and use.

Considering now in further detail the analyzing 104 of the data set for the unframed image 22, and with reference to FIGS. 2, 3, 4, and 6, the analysis is dependent on whether the data set is analyzed in image space or in color space. If it is to be analyzed in image space 6 ("Image Space" branch of 116), then at 118 the pixels are mapped to the rows 7 and columns 8 of the image space 6. At 120, at least one spatial region of pixels, such as those mapped to regions 9a–9f, of the image space 6 are identified as image components. The image components may be located in fixed positions within the image space 6. Some embodiments may use a single image component, which may be, for example, the entire image space 6, a larger central portion 9f, or a smaller central portion 9c. Other embodiments may have a number of image components such as, for example, the five image components 9a–9e. The image components, rather than being in fixed positions in image space, may be dynamically determined based on the image being analyzed. For example, for the landscape scene depicted in FIG. 3, a region 9e encompassing the leaves of the tree, a region 9a encompassing the sky, and a region 9d encompassing the house may be used. At 122, each image component is characterized independently to determine component characteristics such as color, and lightness. These characteristics may be calculated by averaging, by weighted-average techniques such as center-weighting, or the like.

If the data set is to be analyzed in a color space, such as HSL color space 50, then at 124 the pixels are mapped to their appropriate positions within the color space 50. The appropriate position is determined by transforming the RGB parameters for each pixel into the corresponding HSL (or other color space) coordinates, according to calculations known to those skilled in the art. At 126, at least one region of pixels, such as those mapped to regions 58a–58f, of the image space 50 are identified as image components. The preferred method of identifying such regions is via the mathematical technique known as principal component analysis. As is known to those skilled in the art, principal component analysis provides the ability to find clusters of data that are embedded in subspaces of high-dimensional data. See, e.g., M. Kirby, F. Weisser, and G. Dangelmayr, "A model problem in the representation of digital image sequences", *Pattern Recognition*, 26(1):63–73, 1993; see also M. Turk and A. Pentland, "Eigenfaces for recognition", *J. of Cognitive Neurosci.*, 3(1), 1991. Once the appropriate set of image components has been identified, at 128 each image component is characterized independently to determine component characteristics such as color, lightness, pixel concentration, volume, and density.

It is instructive to define these terms, with reference to FIG. 4, before continuing with the analyzing 104 of the data set. "Color" refers to the position defined by the hue 56 and saturation 54 parameters of the component, such as any of components 58a–58f. Since these components occupy a volume, rather than a single point, in the color space, color may be determined by averaging (or weighted-averaging) the hue and saturation of each pixel 51 in the component, determining a central point of the volume, or the like. "Lightness" refers to the position of the component on the lightness axis 52, again determined by averaging, weighted-averaging, or the like. "Pixel concentration" is the percentage of the total image pixels 51 in the data set for the image 22 that are located within the volume of the component. "Volume" is the span of color space 50 that is encompassed by the component. "Density" is the number of pixels 51 per unit volume of the component. It should be note that this list of component characteristics is not exhaustive, and that other characteristics may be chosen to describe the component in accordance with the present invention.

Continuing now with the analyzing 104 of the data set, at 130 the entire image 22 is collectively characterized, based on the individual characteristics of each image component 58a–f, in order to determine a set of overall image characteristics. These characteristics describes the overall color attributes of the image. The overall image characteristics, as will be discussed subsequently in further detail, are used to categorize the image and determine attributes of a visually attractive frame for the image. The image characteristics preferably include, but are not limited to, color temperature, contrast ratio, colorfulness, and color strength. "Color temperature" refers to the visual perception of color in which reds and yellows are perceived as "warm" colors and blues and greens as "cool" colors. "Contrast ratio" describes the range of lightness values present in the components of the image. A low contrast image has components which fall in a narrow range of lightness values, while a high contrast image has components which fall in a wide range of lightness values. "Colorfulness" describes how much of its hue a particular region appears to exhibit. "Color strength" is a photographic term which incorporates combined attributes of both colorfulness and lightness.

Before considering the determining 106 of frame attributes based on the image characteristics, it is useful to consider by way of example, and with reference to Table I, how the image characteristics can be indicative of the subject matter of the image 22. An image 22 with components that primarily have warm colored hues (for example, hues from red to yellow and including orange and burgundy) may be indicative of a portrait of a person. An image 22 with components that primarily have cool colored hues (for example, hues from green to violet and including blue, cyan, and grey) may be indicative of a landscape scene. An image 22 whose white colors are shaded toward warm colors may indicate an indoor photograph taken under incandescent lighting, while an image 22 whose white colors are shaded toward cool colors may indicate an outdoor photo. Image categorizations of this sort are useful in determining the attributes of a frame 26 that will be visually attractive when combined with the image 22. As previously described, the method 100 includes predefining 102 the image categories 32, and specifying framing scheme rules for each image category that will be used by the method 100 to determine frame attributes. In a preferred embodiment, the image categories 32 are implemented as mapping tables in software or firmware. Each image category may specify the rules for determining different aspects of the framing scheme, preferably including a color scheme, intensity, texture, and dimensionality of a border or frame 26 that will be visually attractive when combined with the image 22. The list of image categories in Table I is merely illustrative, and neither comprehensive nor limiting; a wide variety of image categories can be defined and used to determine frame attributes according to the present invention. For example, additional image categories such as floral, city, industrial, and nighttime scenes could be defined, each with its own set of framing scheme rules.

TABLE I

Predefined Image Categories

| Image Characteristics | Image Category | Framing Scheme Rules | | |
|---|---|---|---|---|
| | | Color Scheme | Intensity | Texture | Dimension'ty |
| Primarily warm hues | Portrait | If contrast = normal, color scheme = complementary<br>If contrast = low, color scheme = dark<br>If contrast = high, color scheme = light | Normal | Flat | 2D |
| Primarily cool hues | Landscape | If color = green or blue, color scheme = similar<br>If color = brown, color scheme = contrasting | Strong | Flat | 2D |

TABLE I-continued

Predefined Image Categories

| Image Characteristics | Image Category | Framing Scheme Rules | | | |
|---|---|---|---|---|---|
| | | Color Scheme | Intensity | Texture | Dimension'ty |
| All other combinations | Default | If contrast = normal, color scheme = complementary<br>If contrast = low, color scheme = white<br>If contrast = high, color scheme = black | Muted | Flat | 2D |

Figure 7:
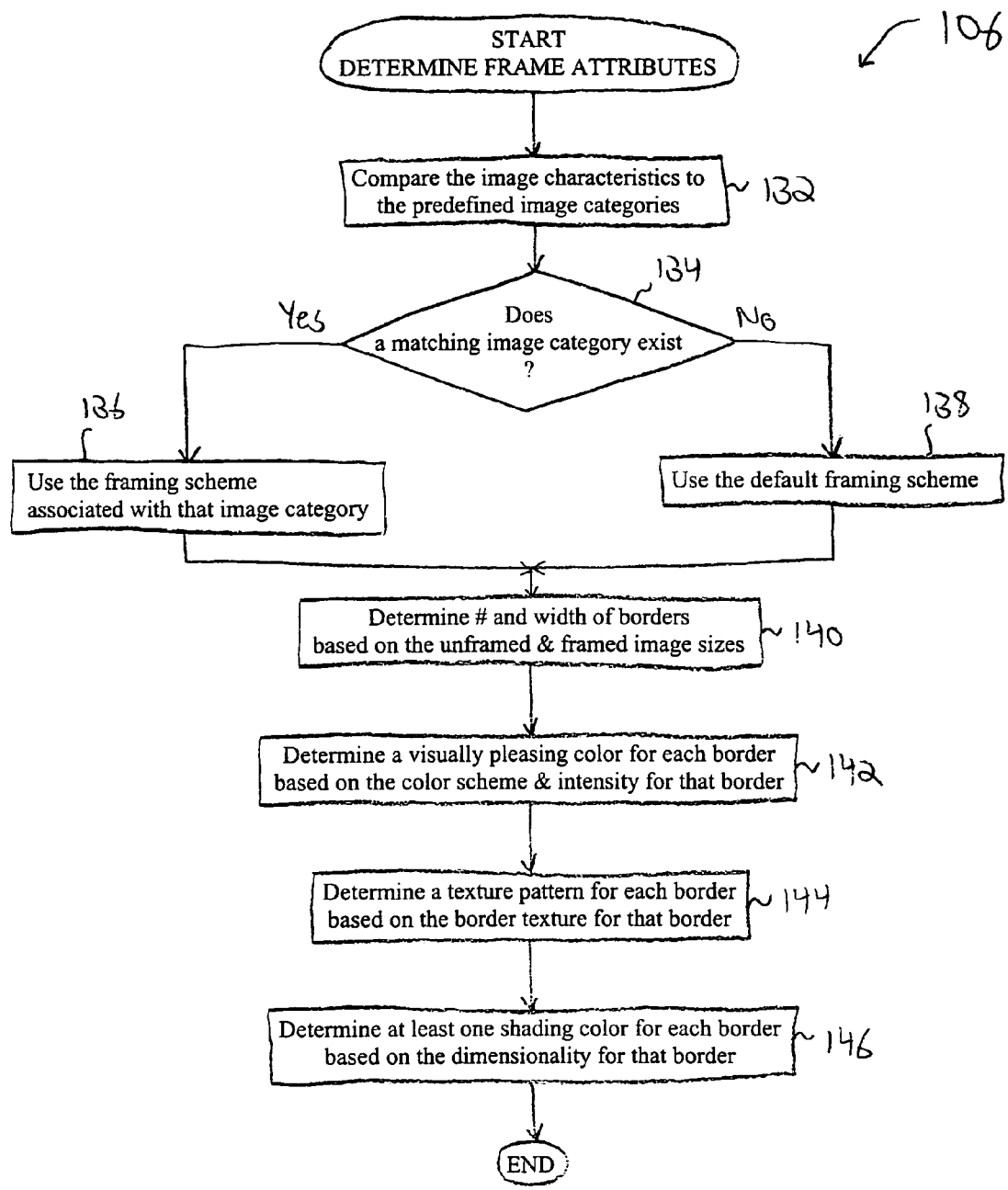

Considering now in further detail the determining 106 of frame attributes of a visually attractive frame 26 for the image 22, and with reference to Table I and FIGS. 2, 4, and 7, the frame attributes that will be determined preferentially include the number of individual borders in the frame 26 and, for each border, the border width, border color, border texture pattern, and border shading pattern. The determining 106 of frame attributes begins at 132 by examining the overall image characteristics to determine whether the image characteristics match one of the predefined image categories. If such a matching image category is found ("Yes" branch of 134), then at 136 the framing scheme associated with that image category is selected for use. If no matching image category is found ("No" branch of 134), then at 138 the framing scheme for the default image category is selected for use.

At 140, the number of borders incorporated in the frame 26, and the width of each border, are determined. The number and width of the borders are preferably determined based on the dimensions of the unframed image representation 22' ($x_i$ and $y_i$) and the framed image 24 ($x_f$ and $y_f$).

If the dimensions of the unframed representation 22' are more than about 60% of the dimensions of the framed image 24, then preferably the frame 26 will include only a single border region. Conversely, if the dimensions of the unframed representation 22' are less than about 30% of the dimensions of the framed image 24, then two or more border regions will preferably be used. As indicated in Table I, the border regions are 2-dimensional by default for all image categories.

At 142, a visually pleasing color for each border is determined. This visually pleasing color is determined based on the color scheme and intensity framing scheme rules for that border. A large number of color schemes may be defined and incorporated into the framing scheme rules. As best understood with reference to Table II, in some of these color schemes, the border color is independent of the colors contained in the image. For example, a "cultural" color scheme would utilize color attributes that are more pleasing to viewers from a particular cultural background, and a "national" color scheme would use certain color combinations that have specific meanings in a particular country. If the image characteristics are indicative of an image concerning the United States, for example, red, white, and blue hues might be used in borders. Similarly, a "gender" color scheme might produce a border with pink hues if the image characteristics are indicative of a girl, and blue hues if indicative of a boy. An Asian color scheme would preferably use more reds and more vivid colors than would a European color scheme.

Figure 8:
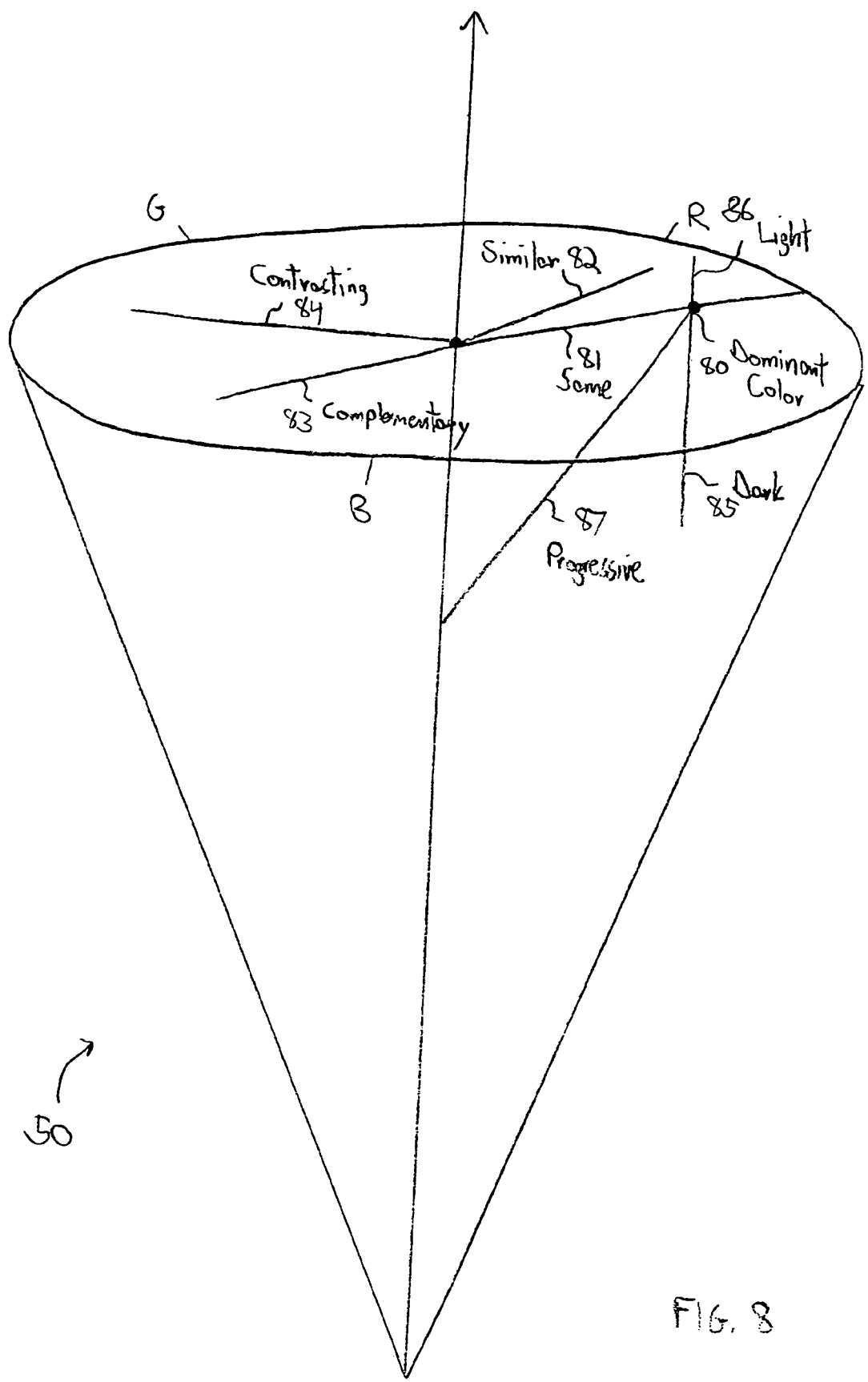
FIG. 8 is a three-dimensional color space representation illustrating a variety of color schemes used to determine a visually attractive frame for the digital image according to the method of FIG. 5.

For others of these color schemes, and with reference to FIG. 8 and Table II, the border color is determined relative to a dominant color contained in the image. The dominant color is preferably that of the principal image component. To illustrate by way of example, the dominant color in an image 22 is indicated by a point 80. A "same" color scheme would use a hue 81 that is the same as the hue of the dominant color 80 in the color space 50. A "similar" color scheme would use a hue 82 that is adjacent in color space 50 to the dominant color 80. A "complementary" color scheme would use a hue 83 that is opposite in color space 50 to the hue of the dominant color 80. A "contrasting" color scheme would use a hue 84 that is adjacent in color space 50 to the opposite hue of the dominant color 80. A "dark" color scheme would use the same hue as the dominant color 80 but a lightness 85 that is less than the lightness of the dominant color 80. A "light" color scheme would use the same hue as the dominant color 80 but a lightness 86 that is more than the lightness of the dominant color 80. A "progressive" color scheme would use the same hue as the dominant color 80 but a lightness and saturation 87 that is less than the lightness and saturation of the dominant color 80. The particular color point on the appropriate line segment 81–87 is determined by the intensity parameter of the framing scheme. The intensity parameter typically provides a choice of a few points along the line segment, which may be denoted as "strong", "normal", and "muted". Where multiple borders are used, the colors of each of the different borders preferably have similar hues.

TABLE II

Color Scheme Implementations

| | Border Color examples |
|---|---|
| Absolute Color Schemes (Independent of Dominant Color) | |
| White | White |
| Black | Black |
| Cultural | More vivid colors and more reds if image = Asian scene |
| National | Red, white, & blue hues if image = United States scene |
| Gender | Pink hue if image = female, blue hue if image = male |
| Relative Color Schemes (Dependent upon Dominant Color) | |
| Same | Same hue as dominant color |
| Similar | Hue adjacent in color space to dominant color |
| Progressive | Same hue as dominant color but different |

TABLE II-continued

Color Scheme Implementations

Border Color examples

| | |
|---|---|
| Complementary | saturation and/or lightness Opposite hue to dominant color |
| Contrasting | Adjacent hue to opposite hue of dominant color |
| Achromatic | Remove color (saturation = 0), same lightness level as dominant color |
| Vivid | Fully saturate the hue |
| Light | Same hue with increased lightness |
| Dark | Same hue with reduced lightness |

At 144, a texture pattern for each border is determined, based on the border texture for that border. Preferably the border texture can be either flat or patterned. All pixels of a border with a flat texture (except for shaded areas, as discussed below) have the same color. In a border with a patterned texture, a pattern is first determined and then replicated to form the border. The pattern is preferably much smaller than the width of the border. The pixels of a pattern preferably use related colors, such as similar or progressive hues, and the pixels on the edges of the pattern are chosen so as to form visually matching interfaces when the pattern is replicated to form the border.

At 146, at least one shading color for each border is determined, based on the dimensionality for that border. Preferably the options for dimensionality are two-dimensional or three-dimensional. Three-dimensional is typically used for only the outermost border, so as to simulate a three-dimensional picture frame. Two-dimensional is typically used for any inner borders, so as to simulate a mat board. In three-dimensional embodiments, two shading colors are preferably provided, one which is lighter than the border color and one which is darker than the border color. The shading colors are typically used at the outer and inner edges of the three-dimensional border. The location of the edges having the lighter shading color and the edges having the darker shading color provide a visual perception of light striking the framed image from a specific direction.

After 146 has been completed, all the frame attributes have been determined. The generation of a data set for the framed image 24 from the data set for the unframed image 22 and the frame attributes is done by conventional means, the details of which are well known to those skilled in the art.

Considering now in further detail the modifying 112 of the mapping relationship, the user has the ability to modify or override the attributes of the frame 26 that is automatically generated based on the image contents without user intervention, as has already been described above. These modifications are preferably performed by changing one or more of the relationships in Table I that determine the framing scheme parameters (color scheme, intensity, texture, and dimensionality) for the particular predefined image category associated with the image being framed. In some embodiments these modifications will apply only to the image presently being framed, while in other embodiments these modifications will also be applied to other images that fall into the image category that is modified. Some embodiments also allow the user to specify the number and width of the borders, the desired size of the framed image 26, and/or a scaled size for the representation 22' of the unframed image. After the mapping relationship has been modified, the determining 106 of frame attributes is performed again.

Returning now to the image processing apparatus 10 in order to consider the image analyzer 20 in further detail, and with reference to FIGS. 1 and 2, the data set for the unframed image may be supplied from image sources which include but are not limited to a mass storage device 12a, a network source 12b, a digital camera 12c, an optical scanner 12d, or the optical scanner module of a multifunction printer 12e. The image analyzer 20 further includes a component identifier 28 which processes the data set as has been previously described so as to identify one or more individual image components. The analyzer 20 also includes a component characterizer 30 which receives the image components from the component identifier 28 and determines at least one component characteristic for certain ones of the individual image components; an image characterizer 34 which is communicatively coupled to the component characterizer 30 for determining at least one image characteristic from the at least one component characteristic as has been previously described; and an image categorizer 36 which is communicatively coupled to the image characterizer 34 for automatically defining the at least one frame attribute from the at least one image characteristic, as has also been previously described in detail. The image processing apparatus 10 also preferably includes a memory 44 accessible by the image categorizer 36, the image categorizer 36 automatically defining the at least one frame attribute in accordance with at least one framing scheme parameter stored in the memory 44. The preferred embodiment of the memory is preferably writeable, and the apparatus 10 preferably also has a user interface 38 communicatively coupled to the memory 44 for modifying the at least one framing scheme parameter.

In the preferred embodiment, the image processing apparatus 10 includes a computing apparatus, and the image analyzer 10 and framed image generator 40 are implemented as computer programs in software, firmware, or a combination thereof. These programs are preferably stored intermittently or permanently in the memory 44. The memory 44 may include both volatile and nonvolatile memory components. Volatile components are those that do not retain data values upon loss of power. Nonvolatile components are those that retain data upon a loss of power. Thus, the memory 44 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

The apparatus 10 can send the data set it generates for the framed image to imaging devices that include but are not limited to a printer 14a, a display or monitor 14b, a network destination 14c, a mass storage device 14d, or a multifunction printer 14e.

From the foregoing it will be appreciated that the image processing apparatus and method provided by the present invention represent a significant advance in the art. Although several specific embodiments of the invention have been described and illustrated, the invention is not limited to the specific methods, forms, or arrangements of parts so described and illustrated. For example, while data set analysis has been discussed with reference to either image space or color space, these analyses are not necessarily exclusive; regions of interest may be identified in image space, and then color space analysis may be performed on only those regions. In addition, while particular sets of component characteristics, overall image characteristics, framing scheme parameters, and frame attributes have been described, it is understood that alternative sets are also usable with the present invention. Consequently, the invention is limited only by the claims.

What is claimed is:

1. A method for automatically generating a framed digital image, comprising:
   analyzing a portion of a first data set representing pixels of an unframed digital image so as to identify a plurality of image components each corresponding to a spatial region of the pixels;
   independently analyzing each of the image components to determine a set of component characteristics for the corresponding image component;
   collectively analyzing the plurality of sets of component characteristics to determine overall image characteristics indicative of subject matter of the unframed image;
   analyzing the overall image characteristics to determine an image category corresponding to the subject matter;
   determining at least one frame attribute by applying framing rules for the image category to the overall image characteristics; and
   generating a second data set representing pixels of the framed digital image, the second data set defining a representation of the unframed digital image surrounded by a frame having the at least one frame attribute.

2. The method of claim 1, wherein the analyzing the portion of the first data set includes:
   mapping the pixels to a two-dimensional image space representative of the rows and columns of the unframed image; and
   selecting region of the two-dimensional image space for each of the image components.

3. The method of claim 2, wherein the region is less than the entire two-dimensional image space.

4. The method of claim 1, wherein the analyzing the portion of the first data set includes:
   mapping the pixels to a three-dimensional color space; and
   selecting region of the three-dimensional color space for each of the image components.

5. The method of claim 4, wherein the selecting is performed in accordance with a principal component analysis technique.

6. The method of claim 1, the independently analyzing further includes:
   identifying at least one of a dominant color of the image component, a dominant lightness of the image component, a pixel concentration of the image component, a color space component volume of the image component, and a color space component density of the image component.

7. The method of claim 1, wherein the overall image characteristics include at least one of color temperature indicative of the warmth or coolness of the image components, contrast ratio indicative of the range of lightness values of the image components colorfulness indicative of the amount of hue exhibited by the image components, and color strength indicative of both colorfulness and lightness of the image components.

8. The method of claim 1, wherein the image category is selected from the group consisting of portrait, landscape, floral, city, industrial, and night.

9. The method of claim 1, wherein the framing rules specify a color scheme selected from the group consisting of same, similar, progressive, complementary, contrasting, achromatic, vivid, dark, and light.

10. The method of claim 1, including:
    modifying the framing rules prior to the determining.

11. The method of claim 1, including:
    sending the second data set to an imaging device for producing the framed digital image.

12. The method of claim 1, wherein the representation of the unframed digital image is scaled in the framed digital image.

13. The method of claim 1, wherein the at least one frame attribute is selected from the group consisting of a border color, a border width, a border texture pattern, at least one shading color, and a number of borders per frame.

14. The method of claim 1, wherein the framing rules specify an intensity selected from the group consisting of normal, strong, and muted.

15. The method of claim 1, wherein the framing rules specify a texture selected from the group consisting of flat and patterned.

16. The method of claim 1, wherein the framing rules specify a dimensionality selected from the group consisting of 2D and 3D.

17. The method of claim 1, wherein, if the image category cannot be determined, determining the at least one frame attribute by applying default framing rules to the overall image characteristics.

18. The method of claim 1, wherein the spatial regions of at least some of the image components have different dimensions.

19. The method of claim 1, wherein the framing rules specify a color scheme that is different from, but visually attractive with regard to, a dominant color of the unframed image.

20. An image processing apparatus comprising
    a component identifier adapted to receive a first data set of pixels representing an unframed digital image and identify a plurality of individual image components therefrom;
    a component characterizer communicatively coupled to the component identifier for determining a set of component characteristics for each of the individual image components;
    an image characterizer communicatively coupled to the component characterizer for determining overall image characteristics from the collective plurality of sets of component characteristics, the overall image characteristics indicative of subject matter of the unframed image;
    an image categorizer communicatively coupled to the image characterizer for determining from the overall image characteristics an image category corresponding to the subject matter;
    framing rules usable by the image cateaorizer to automatically define at least one frame attribute based on the image category and the overall image characteristic; and
    a framed image generator for processing the first data set and the at least one image attribute so as to automatically generate a second data set having rows and columns of pixels representing a framed digital image including a representation of the unframed digital image surrounded by a visually attractive frame having the at least one frame attribute.

21. The image processing apparatus of claim 20, further comprising:
   a memory accessible by the image categorizer, the image categorizer automatically defining the at least one frame attribute in accordance with at least one framing scheme parameter stored in the memory.

22. The image processing apparatus of claim 21, wherein the memory is writeable, further comprising:
   a user interface communicatively coupled to the memory for modifying the at least one framing scheme parameter.

23. A program storage medium readable by a computing apparatus and embodying a program of instructions executable by the computing apparatus for automatically generating a visually pleasing framed digital image from an unframed digital image, the program storage medium comprising:
   a first logical segment of the instructions configured to analyze a portion of a first data set representing pixels of the unframed digital image so as to identify a plurality of image components each corresponding to a region of the pixel;
   a second logical segment of the instructions configured to independently analyze each of the image components to determine a set of component characteristics for the corresponding image component;
   a third logical segment of the instructions configured to collectively analyze the plurality of sets of component characteristics to determine overall image characteristics indicative of subject matter of the unframed image;
   a fourth logical segment of the instructions configured to analyze the overall image characteristics to determine an image category corresponding to the subject matter:
   a fifth logical segment of the instructions configured to determine at least one frame attribute by applying framing rules for the image category to the overall image characteristics; and
   a sixth logical segment of the instructions configured to generate a second data set representing pixels of the framed digital image, the pixels defining a representation of the unframed digital image surrounded by a frame having the at least one frame attribute.

* * * * *

UNITED STATES PATENT AND TRADEMARK OFFICE
CERTIFICATE OF CORRECTION

PATENT NO. : 7,092,564 B2
APPLICATION NO. : 09/845869
DATED : August 15, 2006
INVENTOR(S) : Charles Chi Jia et al.

It is certified that error appears in the above-identified patent and that said Letters Patent is hereby corrected as shown below:

In column 4, line 30, delete "of 10" and insert -- of 110 --, therefor.

In column 11, line 36, in Claim 2, after "selecting" insert -- a --.

In column 11, line 44, in Claim 4, after "selecting" insert -- a --.

In column 11, line 49, in Claim 6, after "claim 1," insert -- wherein --.

In column 11, line 61, in Claim 7, after "components" insert -- , --.

In column 12, line 38, in Claim 20, after "apparatus" insert -- , --.

In column 12, line 57, in Claim 20, delete "cateaorizer" and insert -- categorizer --, therefor.

In column 12, line 59, in Claim 20, delete "characteristic" and insert -- characteristics --, therefor.

In column 13, line 22, in Claim 23, delete "pixel" and insert -- pixels --, therefor.

In column 14, line 11, in Claim 23, delete "matter:" and insert -- matter; --, therefor.

Signed and Sealed this

Tenth Day of March, 2009

JOHN DOLL
*Acting Director of the United States Patent and Trademark Office*